US009183012B2

(12) United States Patent
Chang et al.

(10) Patent No.: US 9,183,012 B2
(45) Date of Patent: Nov. 10, 2015

(54) ADAPTIVE RENDERING BASED ON RUNTIME CAPABILITY CHECK

(75) Inventors: Ming-Chieh Chang, Taipei (TW);
Peng-Jen Chen, Taipei (TW);
Chih-Yung Chen, Taipei (TW);
Sheng-Yao Shih, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 13/530,492

(22) Filed: Jun. 22, 2012

(65) Prior Publication Data

US 2013/0346949 A1    Dec. 26, 2013

(51) Int. Cl.
*G06F 9/44*     (2006.01)
*G06F 9/445*    (2006.01)
*G06F 9/455*    (2006.01)

(52) U.S. Cl.
CPC ........ *G06F 9/44589* (2013.01); *G06F 9/45529* (2013.01)

(58) Field of Classification Search
None
See application file for complete search history.

(56) References Cited

U.S. PATENT DOCUMENTS

| | | | | |
|---|---|---|---|---|
| 5,583,988 | A * | 12/1996 | Crank et al. | 714/48 |
| 7,992,137 | B2 * | 8/2011 | Rideout et al. | 717/131 |
| 8,175,645 | B2 * | 5/2012 | Evans et al. | 455/557 |
| 8,213,924 | B2 * | 7/2012 | Makavy et al. | 455/419 |
| 2003/0093565 | A1 * | 5/2003 | Berger et al. | 709/246 |
| 2003/0177196 | A1 * | 9/2003 | Bhasin et al. | 709/213 |
| 2005/0188056 | A1 * | 8/2005 | Kangas et al. | 709/218 |
| 2007/0101197 | A1 * | 5/2007 | Moore et al. | 714/38 |
| 2007/0168956 | A1 * | 7/2007 | Moore et al. | 717/120 |
| 2008/0235573 | A1   | 9/2008 | Serdy et al. | |
| 2008/0282172 | A1 * | 11/2008 | Bayang et al. | 715/744 |
| 2008/0282175 | A1   | 11/2008 | Costin et al. | |
| 2009/0007073 | A1 * | 1/2009 | Huang et al. | 717/124 |
| 2009/0013320 | A1 * | 1/2009 | Peterson | 718/1 |
| 2010/0149302 | A1 * | 6/2010 | Malik | 348/14.08 |
| 2010/0174607 | A1 * | 7/2010 | Henkin et al. | 705/14.53 |
| 2011/0161912 | A1 * | 6/2011 | Eteminan et al. | 717/101 |
| 2011/0320880 | A1 * | 12/2011 | Wenig et al. | 714/39 |

(Continued)

OTHER PUBLICATIONS

Yu Chen; Xing Xie; Wei-Ying Ma; Hong-Jiang Zhang, "Adapting Web pages for small-screen devices," Internet Computing, IEEE, vol. 9, No. 1, pp. 50,56, Jan.-Feb. 2005.*

(Continued)

*Primary Examiner* — Don Wong
*Assistant Examiner* — Daxin Wu
(74) *Attorney, Agent, or Firm* — Steve Crocker; Danielle Johnston-Holmes; Micky Minhas

(57) ABSTRACT

A runtime capability check determines functionality supported by a client application (e.g. a browser) on a computing device. During the runtime capability check, the client application (e.g. the browser) attempts to execute different function tests to determine its capabilities. The result information from the function tests are stored. The stored result information is used by the client application during subsequent connections with the server (e.g. the cookie is passed from the mobile computing device to the server). Based on the supported functionality as determined by the stored result information, the rendering code is adapted for, generated and delivered to the computing device by the server. For example, when the client application supports the tested functionality then the server renders the content using full feature rendering. When the client application does not support all of the tested functionality then the server renders the content using limited feature rendering.

20 Claims, 8 Drawing Sheets

(56) References Cited

U.S. PATENT DOCUMENTS

2012/0198279 A1* 8/2012 Schroeder ................. 714/32
2012/0222014 A1* 8/2012 Peretz et al. ............... 717/125
2012/0254402 A1* 10/2012 Panidepu et al. ........... 709/224

OTHER PUBLICATIONS

Wai Yip Lum; Lau, F.C.M., "A context-aware decision engine for content adaptation," Pervasive Computing, IEEE, vol. 1, No. 3, pp. 41,49, Jul.-Sep. 2002.*
Scott, "Introducing EnhanceJS: A Smarter, Safer Way to apply Progressive Enhancement", Published on: Feb. 8, 2010, Available at: http://www.filamentgroup.com/lab/introducing_enhancejs_smarter_safer_apply_progressive_enhancement/.
Burridge, Brett, "Server-Side Browser Detection using ASP", Published on: Dec. 17, 1998, Available at: http://www.abiglime.com/webmaster/articles/asp/121798.htm.
"Documentation", Published on: Jun. 15, 2011, Available at: http://modernizr.com/docs/.
Lawson, Bruce, "Mobile-Friendly: The Mobile Web Optimization Guide", Published on: Jul. 28, 2010, Available at: http://dev.opera.com/articles/view/the-mobile-web-optimization-guide/.
"Detecting Devices and their Features", Retrieved on: Jun. 20, 2012, Available at: http://msdn.microsoft.com/en-us/library/jj149688.aspx.

* cited by examiner

ADAPTIVE RENDERING BASED ON RUNTIME CAPABILITY CHECK

BACKGROUND

JavaScript is a popular client scripting language. JavaScript, however, may be implemented using different Virtual Machines (VMs) that support a varying range of functionality that results in different browser/device function capabilities across the computing devices. Many mobile computing devices typically support just a subset of the available JavaScript functions. Some common JavaScript syntax that runs well in browsers of some mobile computing devices (e.g. smartphones, slates) platforms do not operate on other mobile computing devices. Providing and rendering content to the mobile computing devices supporting different functionality can be challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A runtime capability check determines functionality supported by a client application (e.g. a browser) on a computing device (e.g. a mobile computing device) that interacts with a server. During the runtime capability check, the client application (e.g. the browser) attempts to execute different function tests to determine its capabilities. The result information from the function tests are stored. The stored result information is used by the client application during subsequent connections with the server (e.g. the cookie is passed from the mobile computing device to the server). Based on the supported functionality as determined by the stored result information, the rendering code is adapted for, generated and delivered to the computing device by the server. For example, when the client application supports the tested functionality then the server renders the content using full feature rendering. When the client application does not support all of the tested functionality then the server renders the content using limited feature rendering.

DETAILED DESCRIPTION

Figure 1:
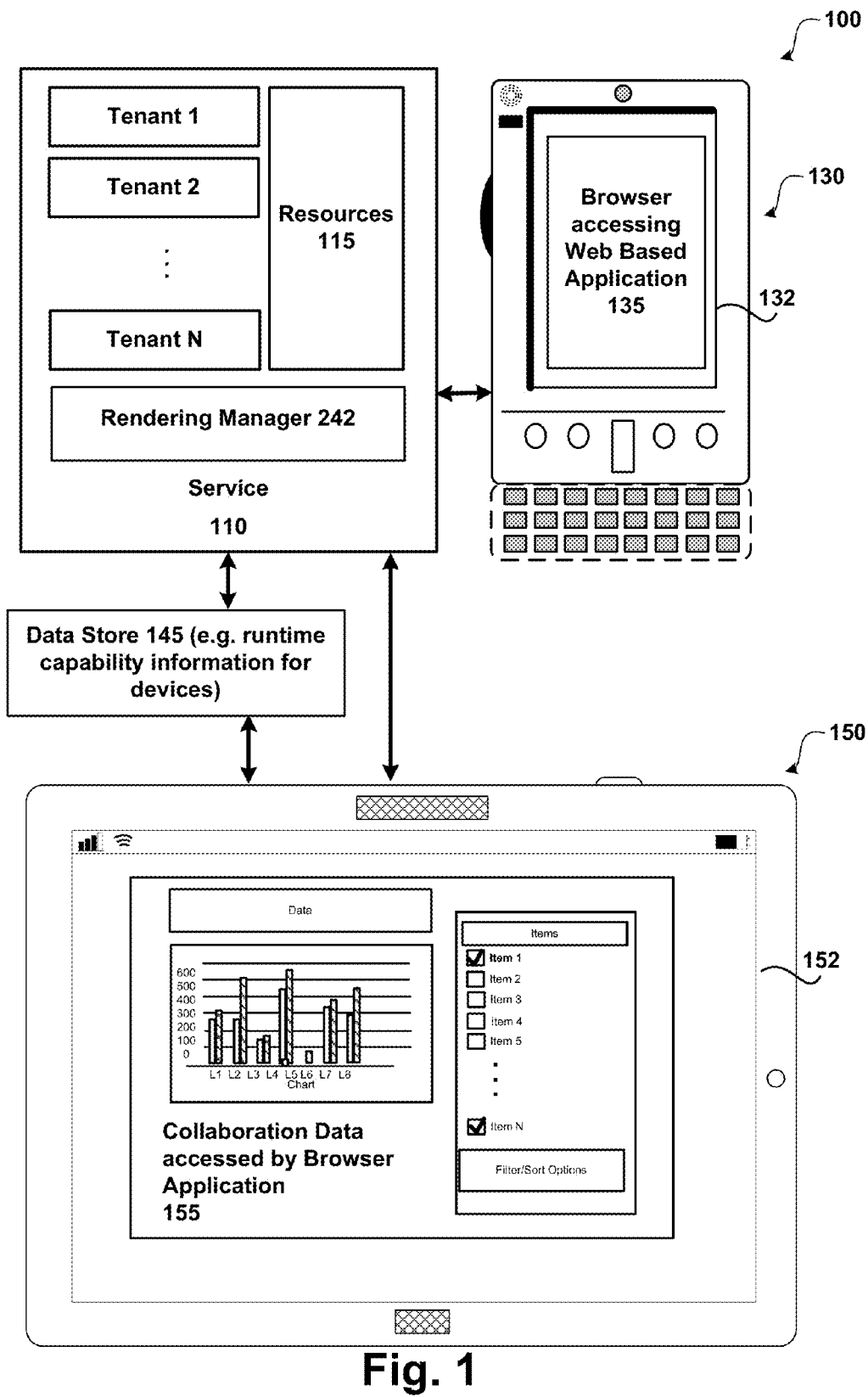
FIG. 1 illustrates an exemplary system for adaptive rendering based on runtime capability check.

Referring now to the drawings, in which like numerals represent like elements, various embodiments will be described.

FIG. 1 illustrates an exemplary system for adaptive rendering based on runtime capability check. As illustrated, system 100 includes service 110, data store 145, mobile computing devices (touch screen input device/display 150 (e.g. a slate) and smart phone 130).

Generally, a client application on a computing device executes a runtime capability check to determine the functionality it supports. Result information is stored and used to generate code delivered to the client application on the computing device. For example, the server/service (e.g. service 110) receives a cookie from the client application (e.g. application 135, 155) that includes the result information for the client application and the web application/service (110) uses the result information to generate the code that utilizes the supported functionality of the client application.

As illustrated, service 110 is a cloud based and/or enterprise based service that may be configured to provide services, such as collaboration services and/or productivity services (e.g. MICROSOFT OFFICE 365 or some other cloud based/online service that is used to interact with items (e.g. data, messages, spreadsheets, documents, charts . . . ), graphic services, web-based applications, and the like. The service may be interacted with using different types of input/output. For example, a user may use touch input, hardware based input, speech input, and the like. Functionality of one or more of the services/applications provided by service 110 may also be configured as a client/server based application. For example, a client device may include an application that performs collaboration operations. Although system 100 shows a service relating to collaboration applications, other services/applications may be configured.

As illustrated, service 110 is a multi-tenant service that provides resources 115 and services to any number of tenants (e.g. Tenants 1-N). Multi-tenant service 110 is a cloud based service that provides resources/services 115 to tenants subscribed to the service and maintains each tenant's data separately and protected from other tenant data.

System 100 as illustrated comprises a touch screen input device/display 150 (e.g. a slate/tablet device) and smart phone 130 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Smart phone 130 and touch screen input device/display 150 include one or more applications (e.g. applications 135 and 155). For example, the devices may include one or more browser applications (e.g. MICROSOFT INTERNET EXPLORER, MOZILLA FIREFOX, GOOGLE CHROME, APPLE SAFARI, and the like). The devices may also include other applications that are configured to connect to a web-based application/service. Smart phone 130 and/or touch screen input device/display 150 may also be configured to receive text/speech input and output text/speech.

As illustrated, touch screen input device/display 150 and smart phone 130 shows exemplary displays 152/132. Display 152 shows the use of web-based application 155 accessing collaboration services over a network, such as the Internet. For example, a user associated with slate 150 may be using application 155 to view/edit collaboration data relating to functionality provided by a web based service 110 such as MICROSOFT SHAREPOINT. According to an embodiment, application 155 is a browser application such as MICROSOFT INTERNET EXPLORER.

A user associated with smartphone 130 may be interacting with a web server using application 135. Many other types of web based applications may be accessed by one or more mobile computing devices. For example, a mobile device may access an online game, a spreadsheet application, a word processing application, a graphics application, and the like over a network. Data, such as collaboration data and runtime capability information, may be stored on a device (e.g. smart phone 130, slate 150 and/or at some other location (e.g. network data store 145). While data store 145 is shown separate from service 110, data store 145 may be located within service 110 and/or outside of service 110. The applications 135, 155 may access data on the client, on a server, from the cloud (e.g. service 110) and/or some combination.

Rendering manager 242 is configured to perform operations relating to adaptive rendering on a computing device, such as mobile computing device 130 and/or mobile computing device 150. While manager 242 is shown within service 110, the functionality of the manager may be included in other locations (e.g. on smart phone 130 and/or slate device 150).

When a client application establishes a connection with the web-based application/service, rendering manager 242 (e.g. located on a server) provides a snippet of code that is used by the client application to perform the runtime capability check. During the runtime capability check, the mobile computing device (e.g. mobile computing device 130, 150) attempts to execute different tests to determine the capabilities of its browser. According to an embodiment, an initial determination is made as to whether the client application supports a scripting language (e.g. JavaScript). In some instances, the client application may crash when performing the initial determination test and/or when one of the functions to test is executed.

The determination that the client application crashed may be detected using different methods. For example, a first time and second time may be recorded before a test is executed with the same current initial time. When the test finishes executing, the second time is updated with the current time that will be after the initial time that was recorded. If both the first time and the second time have the same time value recorded after a predetermined period of time (e.g. some period of time after the test is expected to be completed) then the function test crashed. A user may also issue a refresh command in response to a crash that the server will receive. In response to the determination that the client application crashed, the result information for the initial determination and/or function test may be marked to indicate failure (e.g. "failed", "not supported" . . . ) and stored in the result information (e.g. a cookie).

The function tests may include one or more different tests and may be configured based on the web-based service/application being accessed by the client application. For example, a first set of functionality may be tested during the runtime capability check for a first web based application/service (e.g. MICROSOFT SHAREPOINT) whereas a second set of functionality may be tested for a different web based application (e.g. an online game). Some of the functionality tested for the client application may include, but is not limited to the testing of: transforms (e.g. Cascading Style Sheet (CSS) transforms); JavaScript support; Cookie support; XML HTTP requests, XPath XML, touch input, other input/output, other rendering tests, and the like.

The results from the tests are stored for later use and used by a server computing device that generates the code for rendering content to the client application. For example, a cookie may be stored on the computing device performing the function tests using the client application. The capability information may also be stored in a different location (e.g. within data store 145). The rendering manager 242 may obtain the capability information directly from the client application and/or from another location such as data store 145. Rendering manager 242 may also receive the capability information from the client application and store it in data store 145 for later use. The stored capability information is used during subsequent connections with the server (e.g. the cookie is passed from the mobile computing device to the server and/or capability information is obtained from another location).

Figure 2:
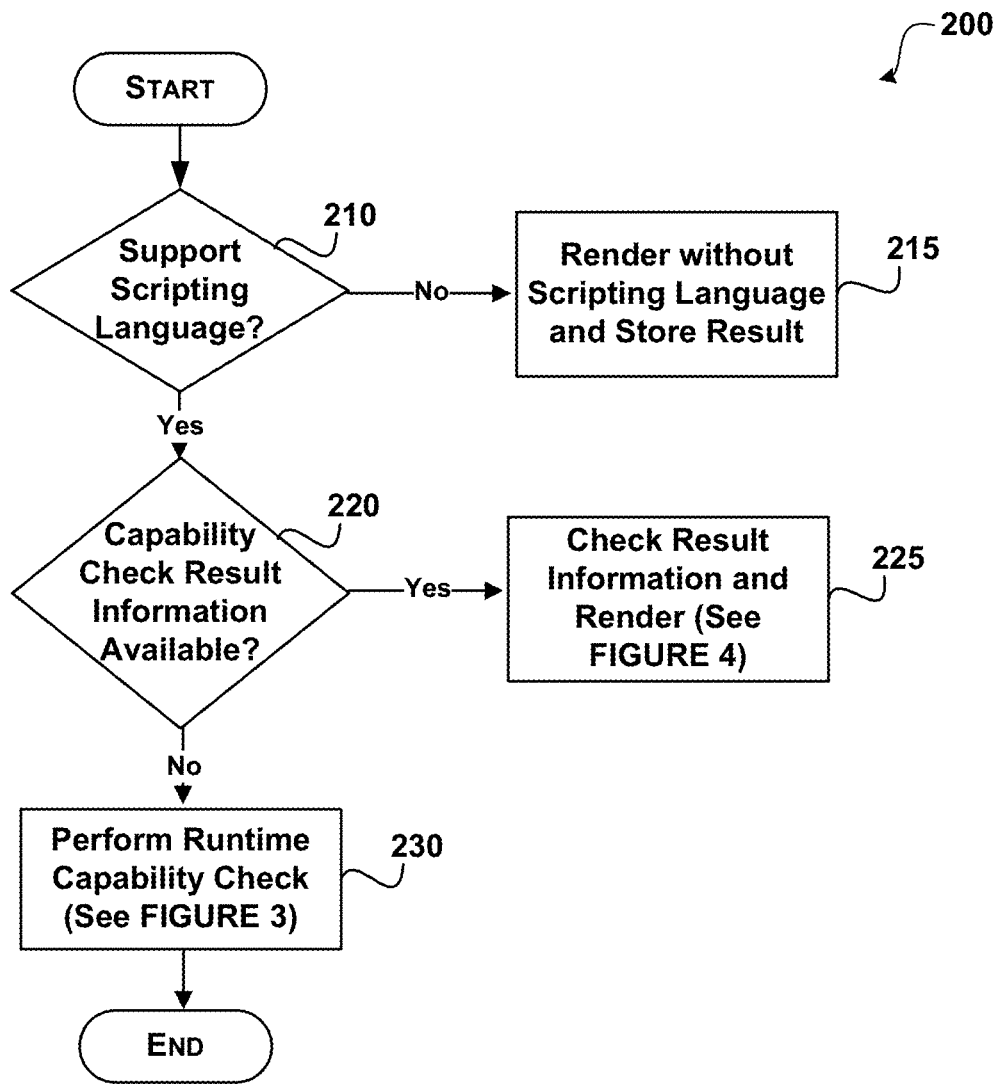
FIG. 2 illustrates a process for performing a runtime capability check and using result information to adaptively render content to a client application.
Figure 3:
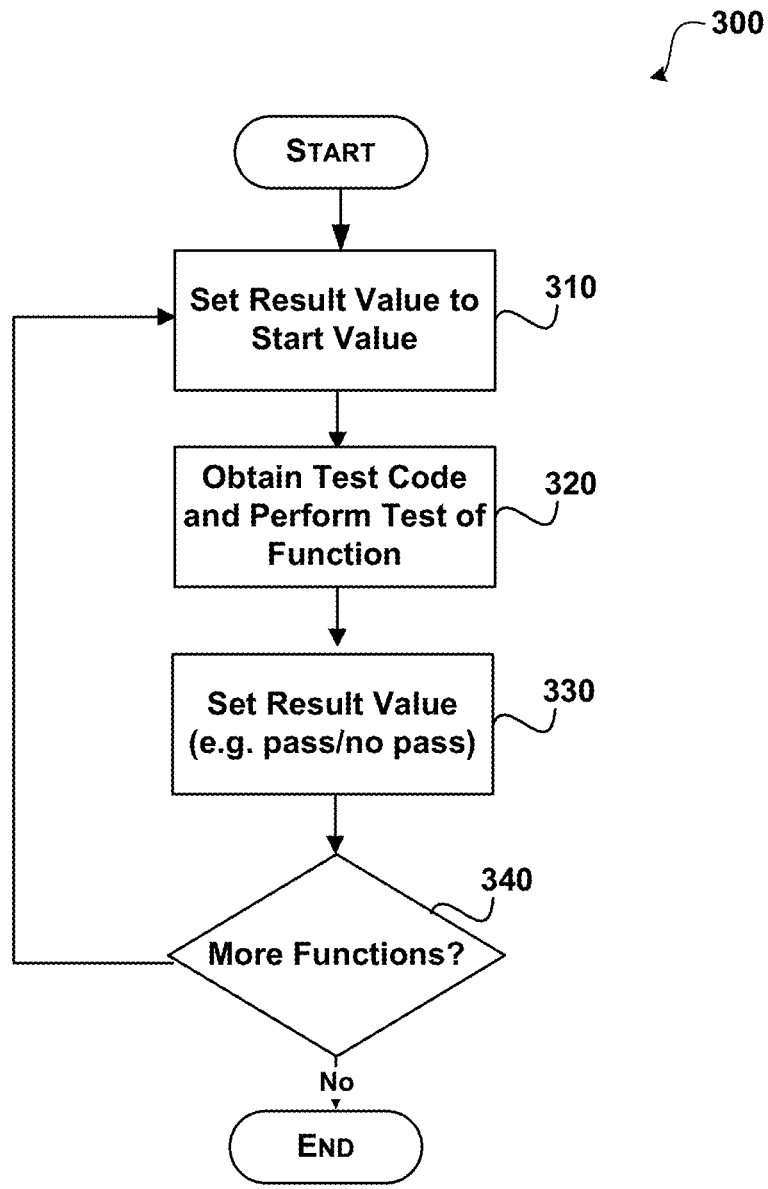
FIG. 3 shows a process for runtime testing capabilities of a client application.
Figure 4:
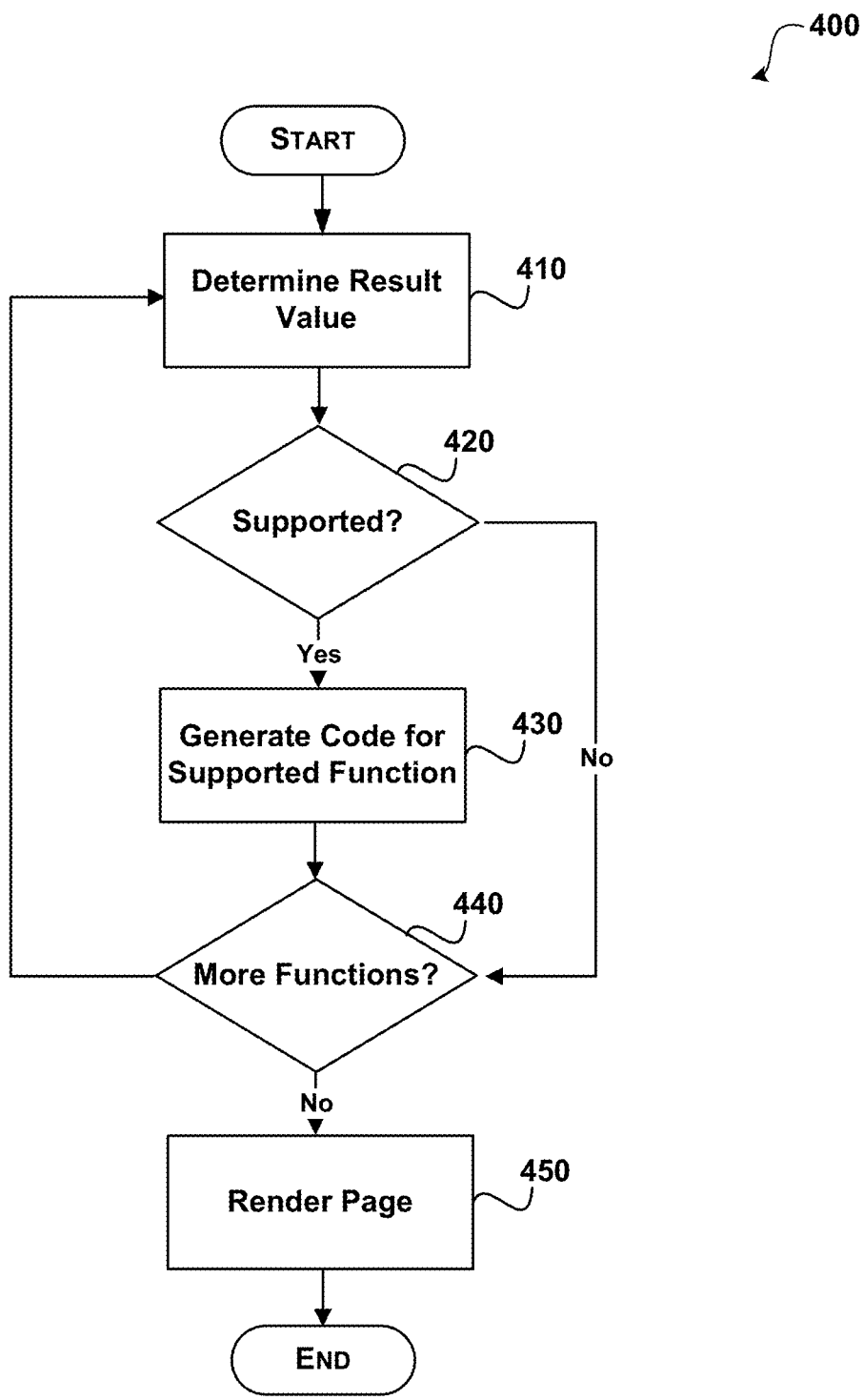
FIG. 4 illustrates a process for checking the runtime capability result information to determine how to render the page.

FIGS. 2-4 show illustrative processes for adaptive rendering based on a runtime capability check. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 2 illustrates a process for performing a runtime capability check and using result information to adaptively render content to a client application.

After a start operation, process 200 flows to decision operation 210, where a determination is made as to whether a client application supports a client side scripting language. The determination may be made using different methods. For example, the browser may be checked to determine if scripting is supported and turned on. As browsers and their capabilities quickly change it is difficult to accurately determine from the browser what scripting functionality is supported by the client application. According to an embodiment, a snippet of code is executed on the mobile computing device to determine if the mobile computing device supports the scripting language (e.g. JavaScript (JS)). The snippet may be provided by a server to the client mobile computing device and/or the client mobile computing device may obtain the snippet from some other location. When the mobile computing device does not support the scripting language, the process flows to operation 215. When the mobile computing device does support the scripting language, the process flows to operation 220.

At operation 215, the page on the mobile device is rendered on the mobile device without using the scripting language. The result information relating to the test to determine whether or not the browser supports the scripting language is stored. According to an embodiment, the result is stored in a cookie on the mobile computing device. The result information may also be stored at some other location (e.g. on the server, in a data store, and the like). This result information may be used upon subsequent connections to the server using the browser such that the check is not performed again. According to an embodiment, the cookie remains valid for a predetermined period of time (e.g. 1 day, 2 days, 1 week, and the like). As long as the cookie is valid, the result information is used.

At decision operation 220, a determination is made as to whether capability check result information is available (i.e. the client application was previously tested to determine supported functionality of the scripting language). When result information is available, the process flows to operation 225. The result information may be obtained using different methods. For example, the result information may be received from the client application on the client device using one or more of a cookie, a query string, a postback, a form submit and a web service. When result information is not available, the process flows to operation 230.

At operation 225, the result information is checked and the page is rendered using the supported functionality as determined by the runtime capability check. Generally, a result for each tested function is checked to determine how to render the page (See FIG. 4 and related discussion for more information).

At operation 230, a runtime capability check is performed on the mobile computing device. Generally, one or more functions is tested to determine the capabilities of the mobile computing device (See FIG. 3 and related discussion).

FIG. 3 shows a process 300 for testing capabilities of a client application.

After a start operation, the process flows to operation 310 where a start value is set for the current function being tested using the client application. For example, before testing a function of a client application to determine capabilities of the client application, a result value is initially set to "start" to indicate that the function test is being attempted. According to an embodiment, the result value (e.g. "start") is set within a cookie on the mobile computing device. The result value may also be stored in a different location (e.g. a data store on the mobile computing device and/or a network data store). When the result value remains set to the "start" value when checked by the server, the server interprets this to indicate that the function crashed before it finished executing.

Moving to operation 320, the test code is obtained and the function is tested using the obtained test code. According to an embodiment, the server to which the mobile computing device connects with provides test code for each function to be tested (e.g. the test code is injected into a download obtained by the client computing device). The server may also be configured to provide the test code for each function as it is tested. Generally, the time period to execute the test for each function is fast and is not noticeable by a user.

Flowing to operation 330, the result value for the tested function(s) is stored within result information and indicates whether or not the functionality is supported/not supported. For example, the result may be a "pass"/"supported" or "no pass"/"not supported" value. The result value may also include more detailed information related to the test (e.g. speed, different parameter values, and the like). According to an embodiment, the result information and corresponding result value for each tested function is stored in a cookie.

Transitioning to decision operation 340, a determination is made as to whether there are more functions to test to determine the capabilities of the client application. When there are more functions to test, the process returns to operation 310 where the function is tested. When there are not functions to be tested, the process flows to an end operation and returns to processing other actions.

FIG. 4 illustrates a process 400 for checking the runtime capability result information to determine how to render the page.

After a start operation, the process flows to operation 410, where the result values for each of the functions is determined. The result information may be obtained using different methods. For example, the result information may be received from the client application on the client device using one or more of a cookie, a query string, a postback, a form submit and a web service. According to an embodiment, each function is tested individually and the rendering of the page is based on each of the function results. For example, even if one or more of the functions fails, the page may be rendered using functionality of the tested functions that passed the test. According to another embodiment, if any of the functions that are tested fails then the page may be rendered using code that does not use functionality specific to the tested functions. The result value may be set to one or more values. As discussed above, other information/values may be stored in the result information.

Moving to decision operation 420, a determination is made as to whether the function tested is supported by the client application. According to an embodiment, the result value is set to "pass" when the function tested succeeds, "failed" when the function tested fails, and "start" when the function tested was started but crashed. When the function tested is not supported (e.g. "failed", "start") the process flows to decision operation 440. When the function tested is supported (e.g. "passed") the process flows to operation 430.

At operation 430, the code for the supported function is generated. For example, when the scripting language is JavaScript, download markup for the supported function is generated using JavaScript. According to an embodiment, the code is generated by the web service/application. The generated code is supplied to the client application for rendering.

Moving to decision operation 440, a determination is made as to whether more functions have been tested and corresponding results to check. When there are more functions to check the results for, the process returns to operation 410 to determine the result value for the tested function. When there are not more functions that were tested, the process flows to operation 450.

At operation 450, the page is rendered on the mobile computing device using the adaptive rendering (e.g. markup that includes scripting language for supported functions of client application) as determined from the supported/non-supported functions on the mobile computing device.

The process then flows to an end operation and returns to processing other actions.

Figure 5:
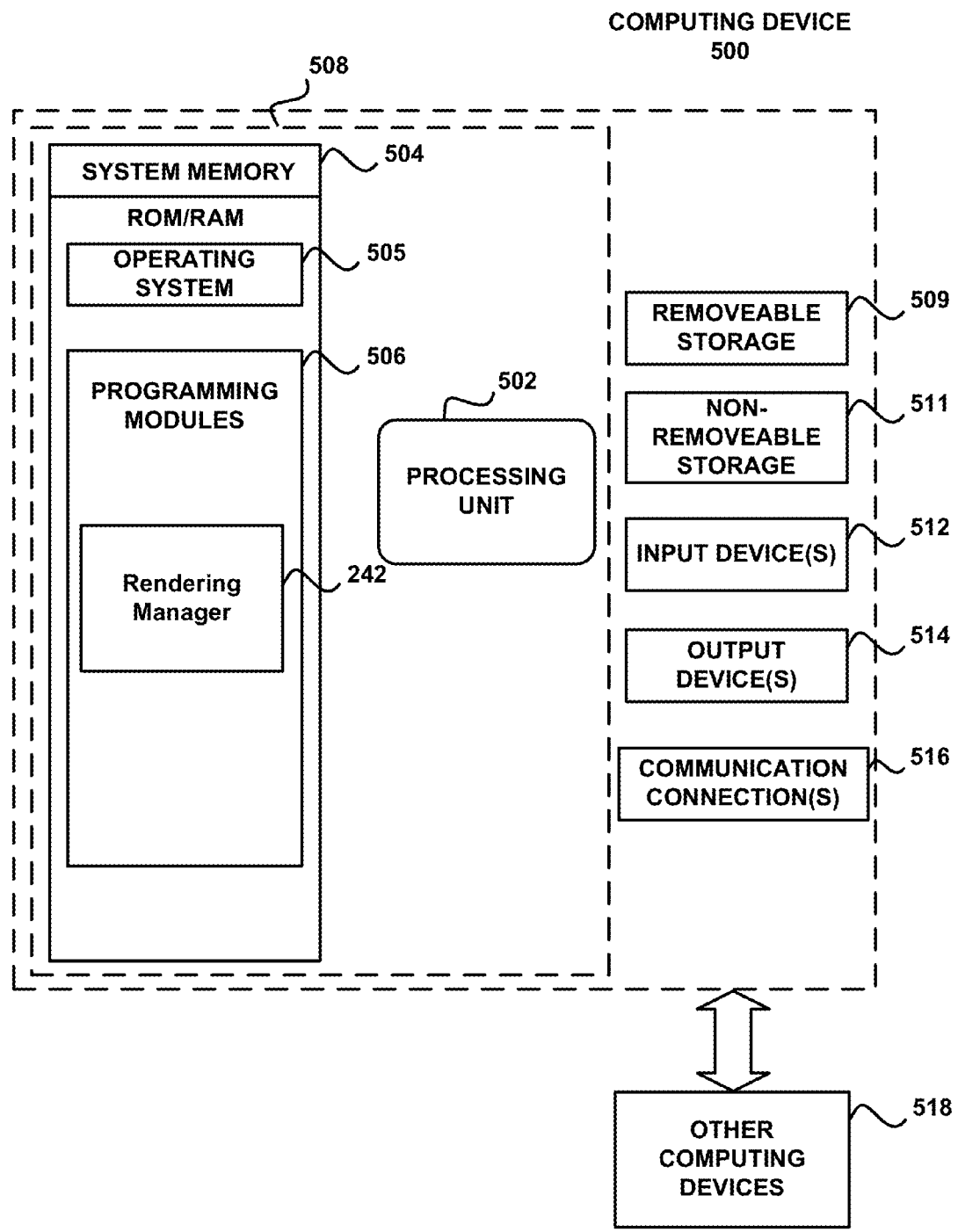
FIGS. 5-7 and the associated descriptions provide a discussion of a variety of operating environments in which embodiments of the invention may be practiced.
Figure 6A:
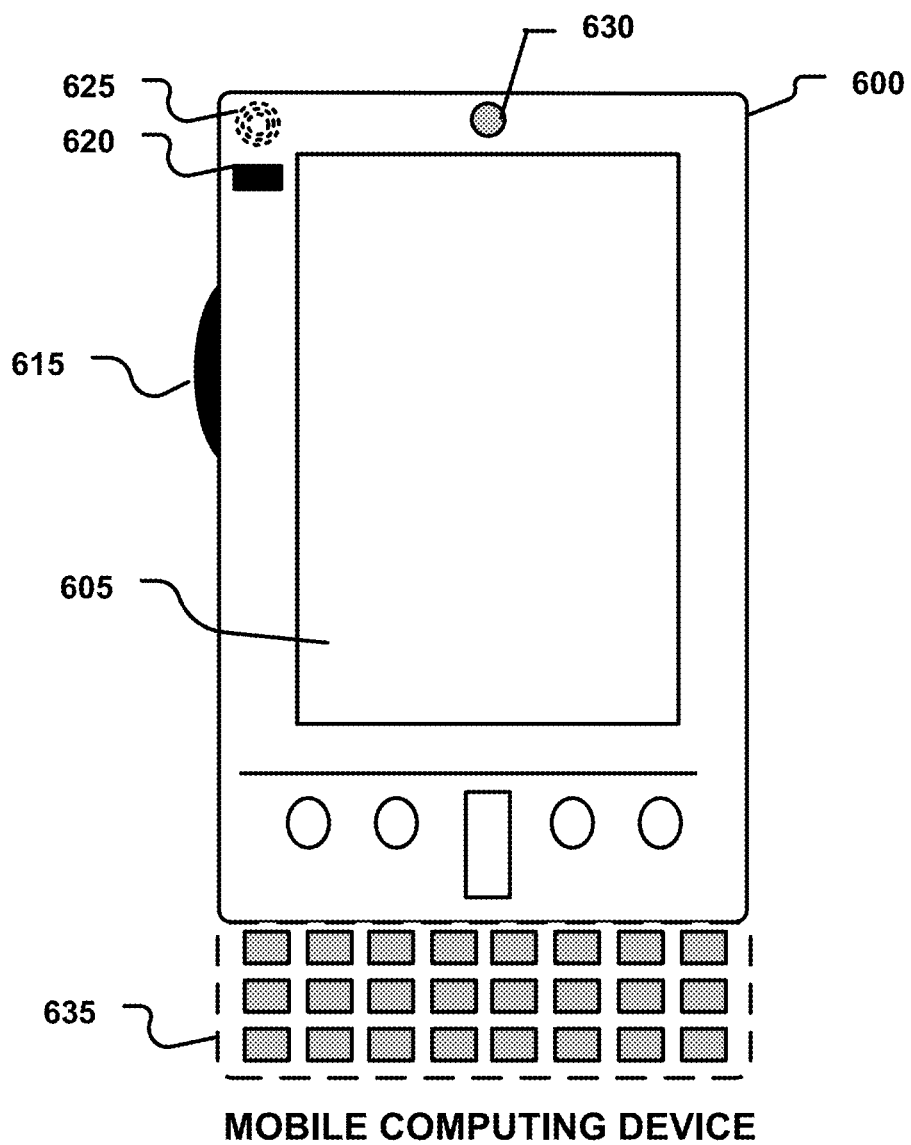
Figure 6B:
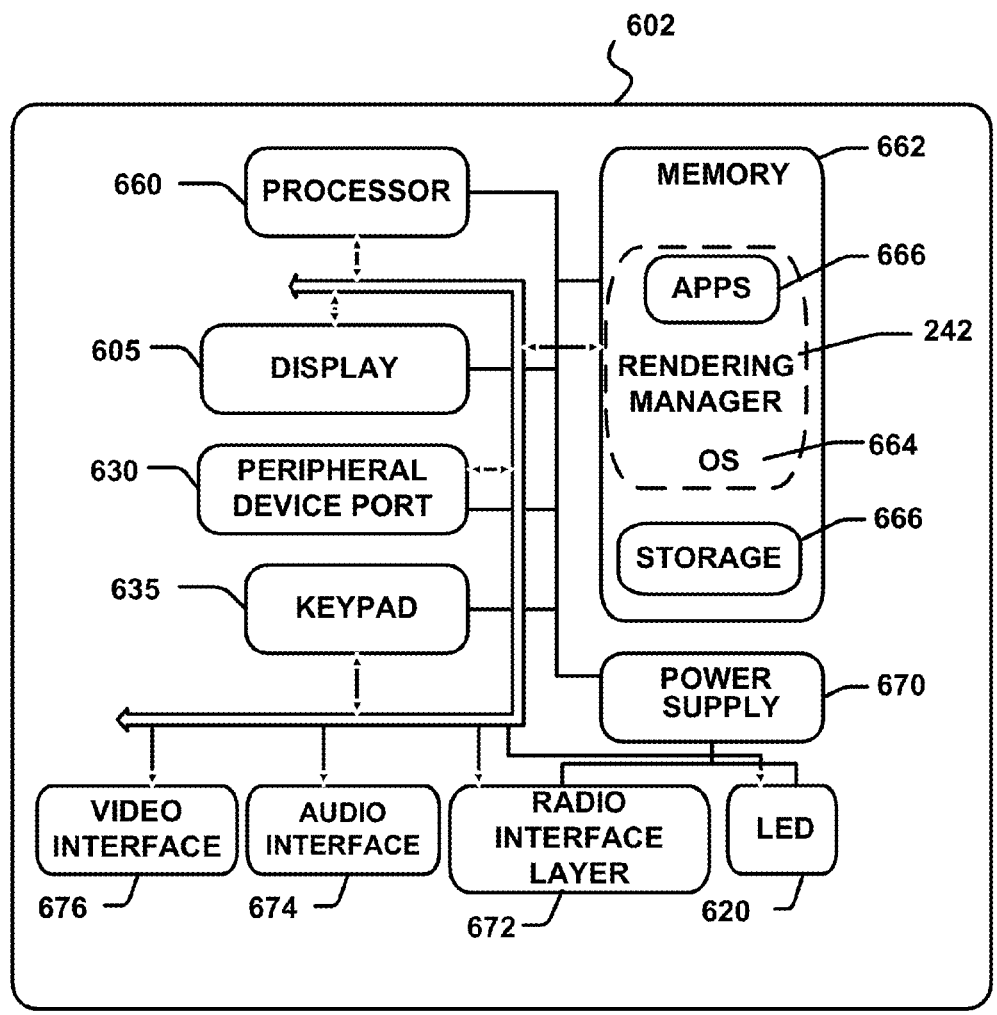
Figure 7:
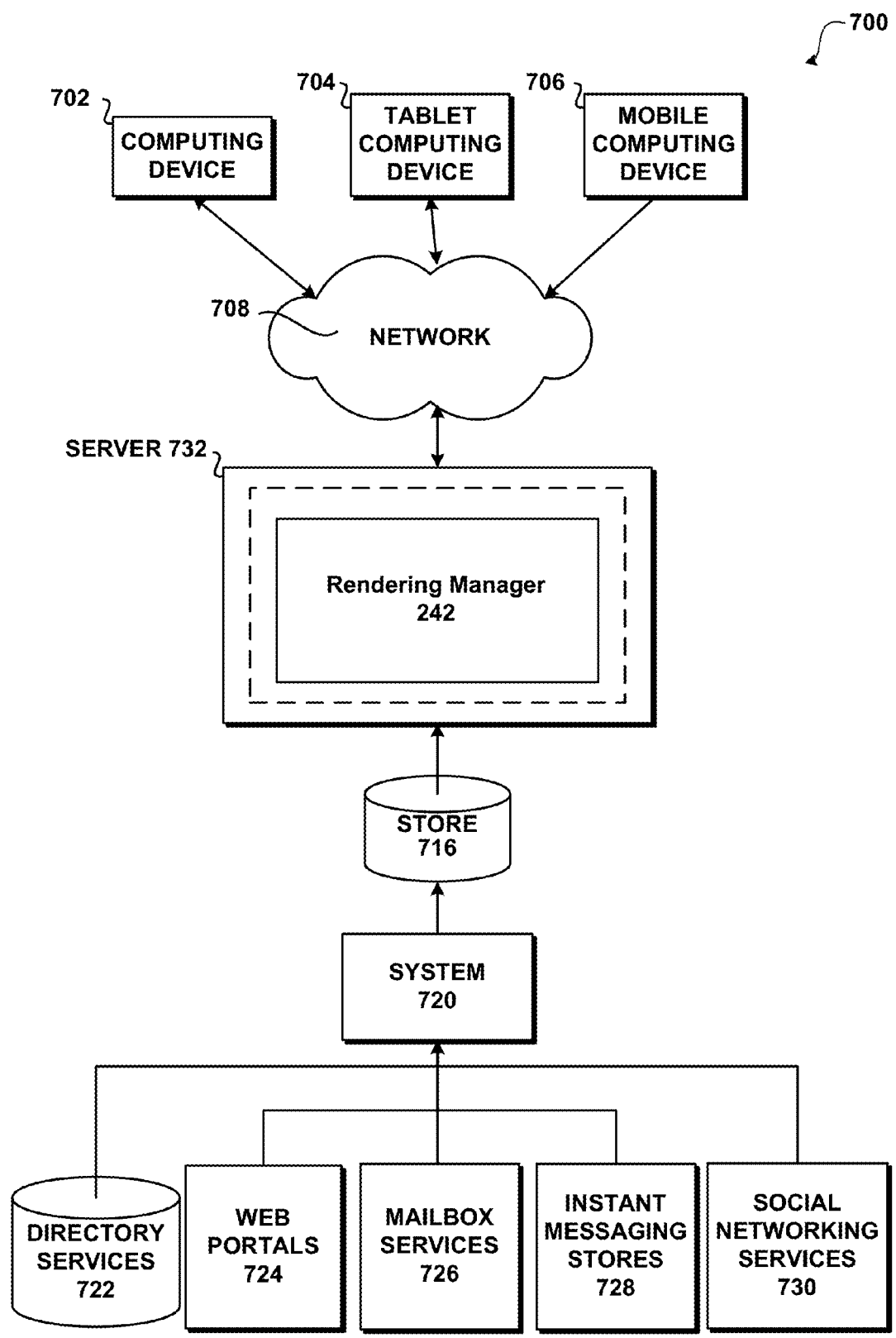

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 500 with which embodiments of the invention may be practiced. The computing device components described below may be suitable for the computing devices described above. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM), magnetoresistive random-access memory (MRAM)), flash memory, or any combination. System memory 504 may include operating system 505, one or more programming modules 506, and includes a web browser application. Operating system 505, for example, may be suitable for controlling computing device 500's operation. In one embodiment, programming modules 506 may include a rendering manager 242, as described above, installed on computing device 500. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510.

As stated above, a number of program modules and data files may be stored in system memory 504, including operating system 505. While executing on processing unit 502, programming modules 506, such as the manager may perform processes including, for example, methods 200, 300 and 400 as described above. The aforementioned processes are an example, and processing unit 502 may perform other processes. Other programming modules that may be used in accordance with embodiments of the present invention may include collaboration applications, project management applications, electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 242 may be operated via application-specific logic integrated with other components of the computing device/system 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, a eyes-tracking device, a motion capture device, etc. Output device(s) 514 such as a display, speakers, a printer, etc. may also be included. The aforementioned devices are examples and others may be used. Communication connection(s) 516 is configured to connect to other computing devices 518

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 600 for implementing the embodiments is illustrated. In a basic configuration, mobile computing device 600 is a handheld computer having both input elements and output elements. Input elements may include touch screen display 605 and input buttons 615 that allow the user to enter information into mobile computing device 600. Mobile computing device 600 may also incorporate an optional side input element 615 allowing further user input. Optional side input element 615 may be a rotary switch, a button, or any other type of manual input element. In alternative embodiments, mobile computing device 600 may incorporate more or less input elements. For example, display 605 may not be a touch screen in some embodiments. In yet another alternative embodiment, the mobile computing device is a portable phone system, such as a cellular phone having display 605 and input buttons 615. Mobile computing device 600 may also include an optional keypad 635. Optional keypad 615 may be a physical keypad or a "soft" keypad generated on the touch screen display.

Mobile computing device 600 incorporates output elements, such as display 605, which can display a graphical user interface (GUI). Other output elements include speaker 625 and LED light 620. Additionally, mobile computing device 600 may incorporate a vibration module (not shown), which causes mobile computing device 600 to vibrate to notify the user of an event. In yet another embodiment, mobile computing device 600 may incorporate a headphone jack (not shown) for providing another means of providing output signals.

Although described herein in combination with mobile computing device 600, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating components of a mobile computing device used in one embodiment, such as the computing device shown in FIG. 6A. That is, mobile computing device 600 can incorporate system 602 to implement some embodiments. For example, system 602 can be used in implementing a "smart phone" that can run one or more applications similar to those of a desktop or notebook computer such as, for example, browser, e-mail, scheduling, instant messaging, and media player applications. In some embodiments, system 602 is integrated as a computing device, such as an integrated personal digital assistant (PDA) and wireless phoneme.

One or more application programs 866 may be loaded into memory 662 and run on or in association with operating system 664. Examples of application programs include dialer programs, e-mail programs, PIM (personal information management) programs, word processing programs, spreadsheet programs, Internet browser programs, messaging programs, and so forth. System 602 also includes non-volatile storage 668 within memory 662. Non-volatile storage 668 may be used to store persistent information that should not be lost if system 602 is powered down. Applications 866 may use and store information in non-volatile storage 668, such as e-mail or other messages used by an e-mail application, and the like. A synchronization application (not shown) may also reside on system 602 and is programmed to interact with a corresponding synchronization application resident on a host computer to keep the information stored in non-volatile storage 668 synchronized with corresponding information stored at the host computer. As should be appreciated, other applications may be loaded into memory 662 and run on the mobile computing device 600, including the rendering manager 242, described above.

System 602 has a power supply 670, which may be implemented as one or more batteries. Power supply 670 might further include an external power source, such as an AC adapter or a powered docking cradle that supplements or recharges the batteries.

System 602 may also include a radio 672 that performs the function of transmitting and receiving radio frequency communications. Radio 672 facilitates wireless connectivity between system 602 and the "outside world", via a communications carrier or service provider. Transmissions to and from radio 672 may be conducted under control of OS 664. In other words, communications received by radio 672 may be disseminated to application programs 866 via OS 664, and vice versa. According to another embodiment, the OS 664 is an optional component and operations may be performed without the use of OS 664.

Radio 672 allows system 602 to communicate with other computing devices, such as over a network. Radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 602 is shown with two types of notification output devices; LED 620 that can be used to provide visual notifications and an audio interface 674 that can be used with speaker 625 to provide audio notifications. These devices may be directly coupled to power supply 670 so that when activated, they remain on for a duration dictated by the notification mechanism even though processor 660 and other components might shut down for conserving battery power. LED 620 may be programmed to remain on indefinitely until the user takes action to indicate the powered-on status of the device. Audio interface 674 is used to provide audible signals to and receive audible signals from the user. For example, in addition to being coupled to speaker 625, audio interface 674 may also be coupled to a microphone 620 to receive audible input, such as to facilitate a telephone conversation. In accordance with embodiments of the present invention, the microphone 620 may also serve as an audio sensor to facilitate control of notifications, as will be described below. System 602 may further include video interface 676 that enables an operation of on-board camera 630 to record still images, video stream, and the like.

A mobile computing device implementing system 602 may have additional features or functionality. For example, the device may also include additional data storage devices (removable and/or non-removable) such as, magnetic disks, optical disks, or tape. Such additional storage is illustrated in FIG. 6B by storage 668. Computer storage media may include volatile and nonvolatile, removable and non-removable media implemented in any method or technology for storage of information, such as computer readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture 700 for adaptive rendering based on a runtime capability check, as described above.

Components managed via the rendering manager 242 may be stored in different communication channels or other storage types. For example, components along with information from which they are developed may be stored using directory services 722, web portals 724, mailbox services 726, instant messaging stores 728 and social networking sites 730. The systems/applications 242, 720 may use any of these types of systems or the like for enabling management and storage of components in a store 716. A server 732 may provide communications for managed components and content to clients. As one example, server 732 may provide project management related services. Server 732 may provide services and content over the web to clients through a network 708. Examples of clients that may utilize server 732 include computing device 702, which may include any general purpose personal computer, a tablet computing device 704 and/or mobile computing device 706 which may include smart phones. Any of these devices may obtain display component management communications and content from the store 716.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for adaptive rendering based on at least one runtime capability check, comprising:
   determining whether first result information stored in response to performing a first runtime capability check is available or is not available, wherein the first runtime capability check includes testing one or more first functions of a client application;
   in response to determining that the first result information is not available, performing the first runtime capability check;
   storing the first result information in response to performing the first runtime capability check, wherein the first result information indicates the client application does not support at least one function of the one or more first functions;
   sending the first result information to a server computing device;
   receiving limited-feature rendered content from the server computing device;
   performing a second runtime capability check, wherein the second runtime capability check includes testing one or more second functions of the client application;
   storing second result information in response to performing the second runtime capability check, wherein the second result information indicates the client application supports the one or more second functions;
   sending the second result information to the server computing device; and
   receiving full-feature rendered content from the server computing device.

2. The method of claim 1, wherein the client application is a browser application and wherein the one or more first functions are different from the one or more second functions.

3. The method of claim 2, further comprising determining if the browser supports a client side scripting language that is received from the server computing device.

4. The method of claim 2, wherein performing the first runtime capability check comprises obtaining test code for the one or more first functions, setting a result value based on an execution of the test code for the one or more first functions, and storing the result value for use when subsequently rendering content.

5. The method of claim 4, wherein setting the result value comprises setting the result value to a start value before the test code is executed and changing the result value from the start value to a different result value after the test code is executed.

6. The method of claim 1, wherein storing the first result information based on the performance of the first runtime capability check comprises storing the first result information in a cookie that is passed to the server computing device and is used by the server computing device to adaptively generate content that is rendered using the client application.

7. The method of claim 1, further comprising providing the first result information to the server computing device using at least one of: a cookie, a query string, a postback, a form submit and a web service.

8. The method of claim 1, wherein determining whether the first result information stored in response to performing the first runtime capability check is available or not available comprises determining when a cookie that stores the first result information exists.

9. The method of claim 4, further comprising determining when at least one of the tested first functions fails before the test code finishes executing.

10. A hardware computer storage device, having computer-executable instructions that, when executed by a processor, perform a method for adaptive rendering based on at least one runtime capability check, the method comprising:
  determining whether first result information stored in response to performing a first runtime capability check is available or is not available, wherein the first runtime capability check includes testing one or more first functions of a client application;
  in response to determining that the first result information is not available, performing the first runtime capability check on a computing device using a browser application;
  storing the first result information in response to performing the first runtime capability check, wherein the first result information indicates the client application does not support at least one function of the one or more first functions;
  sending the first result information to a server computing device;
  receiving limited-feature rendered content from the server computing device;
  performing a second runtime capability check, wherein the second runtime capability check includes testing one or more second functions of the client application;
  storing second result information in response to performing the second runtime capability check, wherein the second result information indicates the client application supports the one or more second functions;
  sending the second result information to the server computing device; and
  receiving full-feature rendered content from the server computing device.

11. The hardware computer storage device of claim 10, the method further comprising determining if the browser supports a client side scripting language.

12. The hardware computer storage device of claim 10, wherein performing the first runtime capability check comprises setting a result value based on an execution of test code for the one or more first functions, and storing the result value for use when subsequently rendering content.

13. The hardware computer storage device of claim 12, wherein setting the result value comprises setting the result value to a start value before the test code is executed and changing the result value from the start value to a different result value after the test code is executed.

14. The hardware computer storage device of claim 10, wherein storing the first result information in response to the performance of the first runtime capability check comprises storing the first result information in a cookie that is used by the server computing device to adaptively generate content that is rendered using the browser.

15. The hardware computer storage device of claim 10, the method further comprising providing the first result information to the server computing device using at least one of: a cookie, a query string, a postback, a form submit and a web service.

16. The hardware computer storage device of claim 10, wherein determining whether first result information stored in response to performing a first runtime capability check is available comprises determining when a cookie that stores the first result information exists.

17. A system for adaptive rendering based on a runtime capability check, comprising:
  a processor and a computer-readable medium;
  an operating environment stored on the computer-readable medium and executing on the processor; and
  a manager operating under the control of the operating environment and operative to perform actions comprising:
  determining if a browser supports a client side scripting language;
  determining whether first result information stored in response to preforming a first runtime capability check is available or is not available, wherein the first runtime capability check includes testing one or more first functions of a client application;
  in response to determining that the first result information is not available, performing the first runtime capability check on a computing device using the browser application;
  storing the first result information in response to performing the first runtime capability check, wherein the first result information indicates the client application does not support at least one function of the one or more first functions;
  sending the first result information to a server computing device;
  receiving limited-feature rendered content from the server computing device;
  performing a second runtime capability check, wherein the second runtime capability check includes testing one or more second functions of the client application;
  storing second result information in response to performing the second runtime capability check, wherein the second result information indicates the client application supports the one or more second functions;
  sending the second result information to the server computing device; and
  receiving full-feature rendered content from the server computing device.

18. The system of claim 17, wherein performing the first runtime capability check comprises setting a result value based on an execution of test code for the one or more first functions, and storing the result value for use when subsequently rendering content.

19. The system of claim 18, wherein setting the result value comprises setting the result value to a start value before the test code is executed and changing the result value from the start value to a different result value after the test code is executed.

20. The system of claim 17, further comprising providing the first result information to the server computing device using at least one of:
  a cookie, a query string, a postback, a form submit and a web service.

* * * * *